(12) United States Patent
Deng

(10) Patent No.: US 11,781,366 B2
(45) Date of Patent: Oct. 10, 2023

(54) VEHICLE-MOUNTED LUGGAGE CASE WITH DOORS OPENING ON BOTH SIDES

(71) Applicant: Hubei Province Huiyun Electric Machinery Co., Ltd., Jingzhou (CN)

(72) Inventor: Shangyun Deng, Guangzhou (CN)

(73) Assignee: HUBEI PROVINCE HUIYUN ELECTRIC MACHINERY CO., LTD., Jingzhou (CN)

( * ) Notice: Subject to any disclaimer, the term of this patent is extended or adjusted under 35 U.S.C. 154(b) by 315 days.

(21) Appl. No.: 17/382,787

(22) Filed: Jul. 22, 2021

(65) Prior Publication Data
US 2022/0412144 A1    Dec. 29, 2022

(30) Foreign Application Priority Data
Jun. 29, 2021 (CN) .......................... 202110727321.1

(51) Int. Cl.
*B60R 9/055* (2006.01)
*E05F 15/63* (2015.01)

(52) U.S. Cl.
CPC .............. *E05F 15/63* (2015.01); *B60R 9/055* (2013.01); *E05Y 2201/624* (2013.01); *E05Y 2201/686* (2013.01); *E05Y 2201/712* (2013.01); *E05Y 2400/324* (2013.01); *E05Y 2400/354* (2013.01); *E05Y 2400/614* (2013.01); *E05Y 2400/66* (2013.01); *E05Y 2900/602* (2013.01)

(58) Field of Classification Search
CPC ....................................... B60R 9/055
USPC .......................................... 224/328
See application file for complete search history.

(56) References Cited

U.S. PATENT DOCUMENTS

| D244,016 | S | * | 4/1977 | Waldman | D12/404 |
|---|---|---|---|---|---|
| 4,173,965 | A | * | 11/1979 | Vallee | B60R 9/055 224/315 |
| D295,620 | S | * | 5/1988 | Littrell | D12/413 |
| 10,464,497 | B2 | * | 11/2019 | Kondo | E05F 15/611 |
| 11,667,246 | B1 | * | 6/2023 | Baca | B60R 15/02 4/596 |
| 2020/0039443 | A1 | * | 2/2020 | Yang | B29C 41/04 |
| 2022/0185084 | A1 | * | 6/2022 | Deng | A45B 11/00 |
| 2022/0412144 | A1 | * | 12/2022 | Deng | B60R 9/055 |

* cited by examiner

*Primary Examiner* — Justin M Larson
(74) *Attorney, Agent, or Firm* — Muncy, Geissler, Olds & Lowe, P.C.

(57) ABSTRACT

The present application relates to the technical field of vehicle-mounted luggage, and discloses a vehicle-mounted luggage case with doors opening on both sides, including: a case bottom, a center-shaft split-type case lid, a lid opening mechanism, a power supply assembly and an electric control assembly, wherein an operation panel is provided on either side of the case bottom, a sealed compartment is provided at either end of the case bottom, a luggage compartment is formed between two sealed compartments, a bulkhead is formed on a side of the luggage compartment proximal to the two sealed compartments. The present application is not only provided with a center-shaft split-type case lid for convenient access, but can also effectively widen the size of the case bottom, and can open and close the lid electrically, which is more convenient to operate, and has the function of self-storing electric energy.

10 Claims, 3 Drawing Sheets

US 11,781,366 B2

VEHICLE-MOUNTED LUGGAGE CASE WITH DOORS OPENING ON BOTH SIDES

CROSS-REFERENCE TO RELATED APPLICATIONS

This application claims the benefit of Chinese Patent Application No. 202110727321.1, filed on Jun. 29, 2021 in the National Intellectual Property Administration of China, the disclosure of which is incorporated herein by reference in its entirety.

TECHNICAL FIELD

The present application relates to the technical field of vehicle-mounted luggage, in particular to a vehicle-mounted luggage case with doors opening on both sides.

BACKGROUND

A vehicle-mounted luggage case is a kind of storage device installed on the roof of a vehicle. Without being limited by the storage space in the vehicle, the vehicle-mounted top luggage case can solve the problem of the limitation of storage space. Nowadays, vehicle-mounted luggage cases on the market are all manual luggage cases with single door opening, and due to its high installation position, have the following defects in use.

(1) Openings of the existing vehicle-mounted luggage cases are too small to facilitate access, the size of the vehicle-mounted luggage cases is limited, and the height after opening the lid is too high, making it difficult to close the door.

(2) The function of the existing vehicle-mounted luggage case is simple, which requires manual operation, and is inconvenient to use.

SUMMARY OF THE INVENTION

In order to overcome the shortcomings of the prior art, an object of the present application is to provide a remote control vehicle-mounted luggage case with doors opening on both sides, which is not only provided with a center-shaft split-type case lid for convenient access, but can also effectively widen the size of the case bottom, as well as can electrically open and close the lid, which is more convenient to operate, and also has the function of self-storing electric energy.

The object of the present application is achieved by adopting the following technical solutions.

A vehicle-mounted luggage case with doors opening on both sides, including: a case bottom, a center-shaft split-type case lid, a lid opening mechanism, a power supply assembly and an electric control assembly, wherein an operation panel is provided on either side of the case bottom, a sealed compartment is provided at either end of the case bottom, a luggage compartment is formed between two sealed compartments, a bulkhead is formed on a side of the luggage compartment proximal to the two sealed compartments, and a hinge shaft seat is provided at a middle position of the bulkhead proximal to a top;

the central axis split-type case lid includes a lid symmetrically hinged between two hinge shaft seats, and an electromagnetic lock is provided at a buckling position between the case bottom and the lid;

the lid opening mechanism is symmetrically arranged on the bulkheads at both ends of the lid, and the lid opening mechanism is connected with the lid;

the power supply assembly includes a solar panel and a battery that are electrically connected, wherein the solar panel is disposed on a top of the sealed compartment on one side, and the battery is disposed in the sealed compartment on another side; and the electric control assembly is arranged in the sealed compartment on one side, and the electric control assembly is electrically connected with the operation panel, the electromagnetic lock and the lid opening mechanism, respectively.

Further, the lid opening mechanism includes a lid opening motor, a sector gear and a link arm mechanism, wherein the lid opening motor is arranged on an inner wall of the sealed compartment, the sector gear is rotatably arranged on the bulkhead, one end of the link arm mechanism is hinged with the sector gear, and the other end is hinged with an end of the lid.

Further, the lid opening mechanism further includes two stroke switches, wherein the two stroke switches are arranged on the bulkhead, and are separately configured to detect a left limit and a right limit of the rotation of the sector gear, so as to determine that the lid is in the highest position or in a closed state.

Further, a gear cover is provided on an outer side of the sector gear.

Further, an emergency door opening lock is provided on the lid.

Further, the electric control component includes a GPS positioning module.

Further, a gap between two lids is provided with a sealing strip, wherein the sealing strip is arranged between the two hinge shaft seats.

Further, a drainage groove is provided on an upper side of the bulkhead.

Further, it also includes a remote control, which is wirelessly connected with the electric control component.

Further, a mounting frame is provided under the case bottom.

Compared with the prior art, the present application has the following beneficial effects.

(1) A center-shaft split-type case lid is provided, lids on both sides can be opened synchronously along a center axis of a case bottom with a large opening for convenient access, and the size of the case bottom can be effectively widened.

(2) A lid opening mechanism is provided which can be quickly controlled to drive the lid to open or close through an operation panel and an electric control assembly, which solves the problem of difficulty in closing the door and makes the operation more convenient.

(3) A power supply component is provided, which absorbs solar energy through a solar panel and converts it into electric energy to be stored in a battery for use, and has the function of self-storing solar energy conversion, reducing dependence on vehicle batteries.

The present application is not only provided with a center-shaft split-type case lid for convenient access, but can also effectively widen the size of the case bottom, and can open and close the lid electrically, which is more convenient to operate, and has the function of self-storing electric energy.

In the figure: 1. case bottom; 11. luggage compartment; 12. operation panel; 13. electromagnetic lock; 14. hinge shaft seat; 2. sealed compartment; 3. central shaft split-type case lid; 31. emergency opening door lock; 4 5. solar panel; 5. lid opening mechanism; 51. lid opening motor; 52. sector gear; 53, link arm mechanism; 54, stroke switch; 6. mounting frame; 7. gear cover; 8. electric control module; 9. drainage groove; 10. sealing strip.

DETAILED DESCRIPTION

In the following, the present application will be further described with reference to the drawings and specific implementations. It should be noted that, provided that there is no conflict, the following embodiments or technical features can be arbitrarily combined to form new embodiments.

Figure 1:
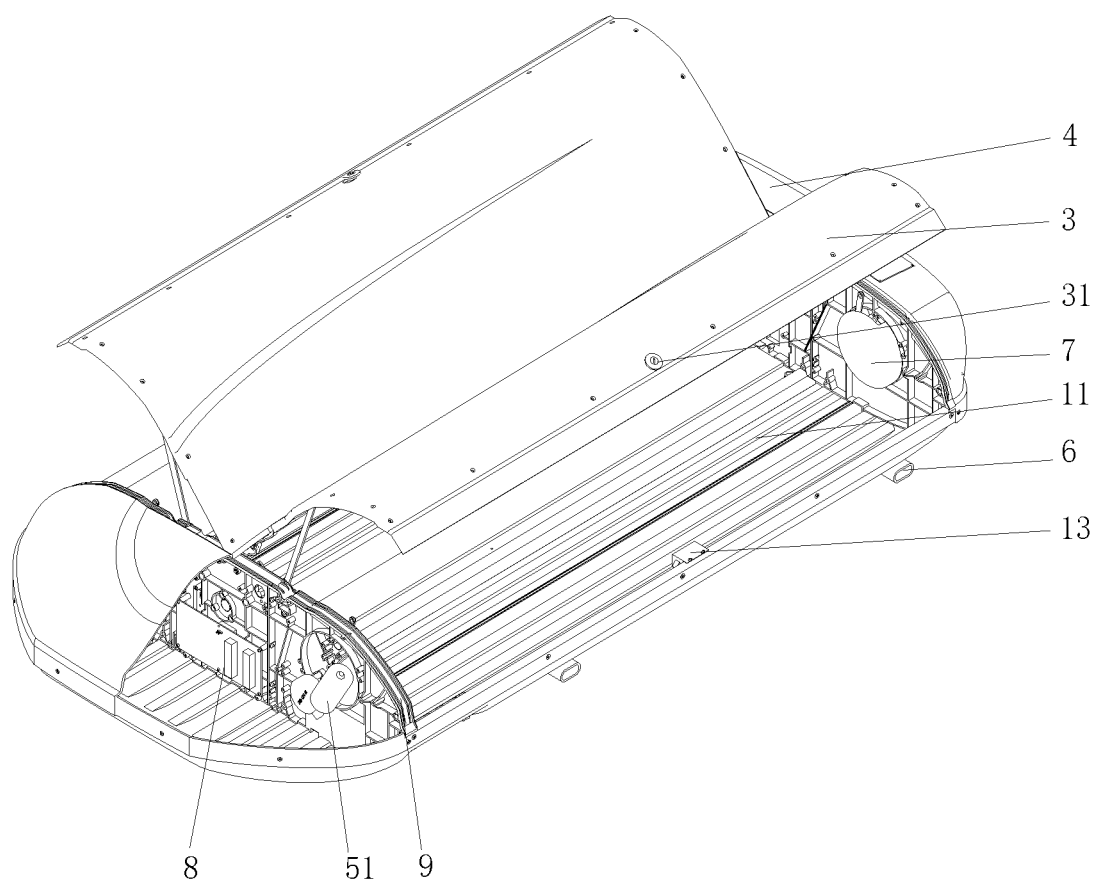
FIG. 1 is a schematic structural diagram of an embodiment of the present application.
Figure 2:
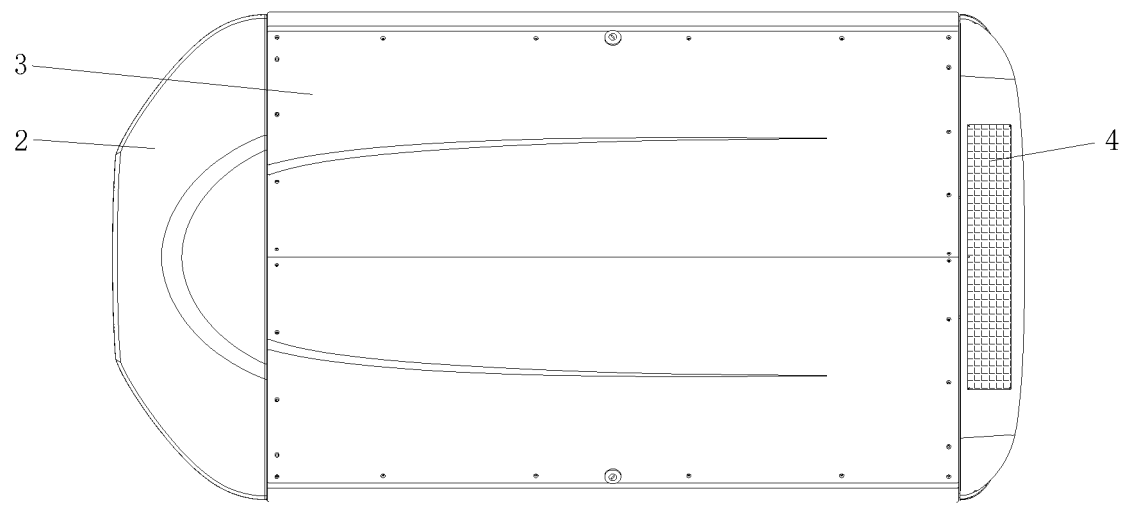
FIG. 2 is a top view of an embodiment of the present application.
Figure 3:
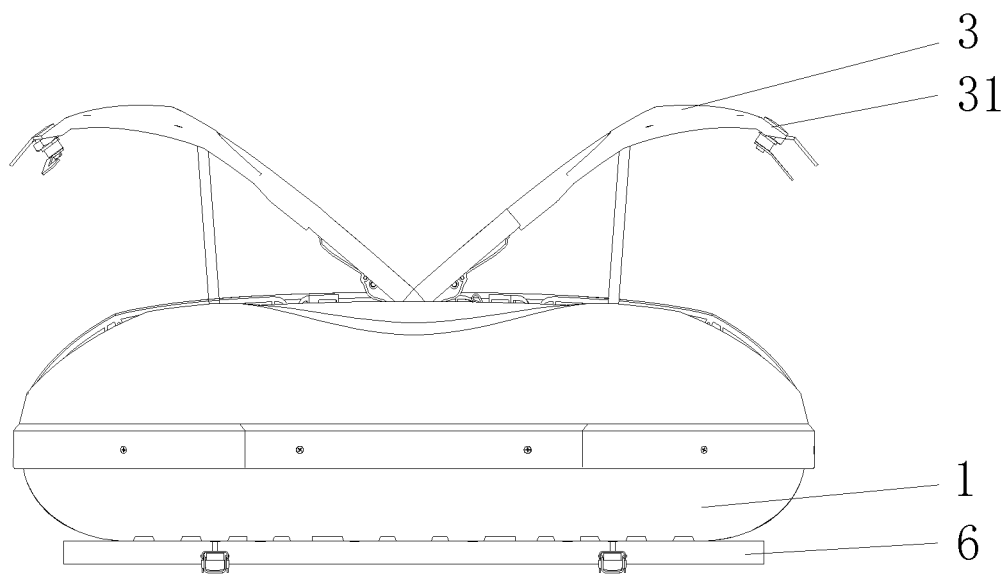
FIG. 3 is a left side view of an embodiment of the present application.
Figure 4:
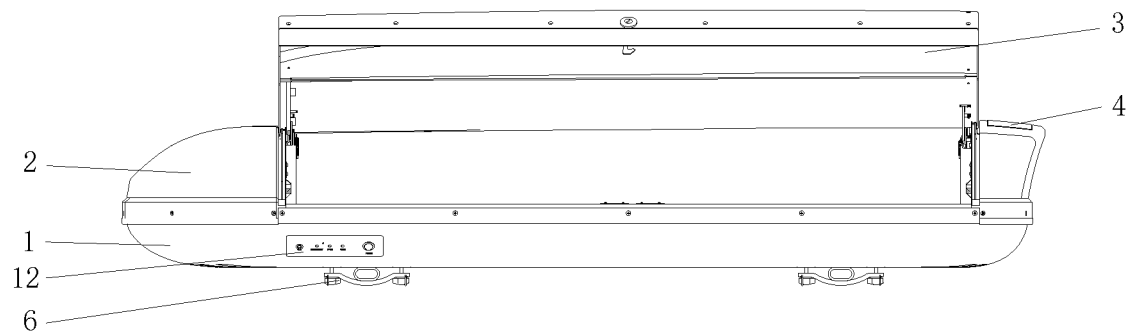
FIG. 4 is a front view of an embodiment of the present application.
Figure 5:
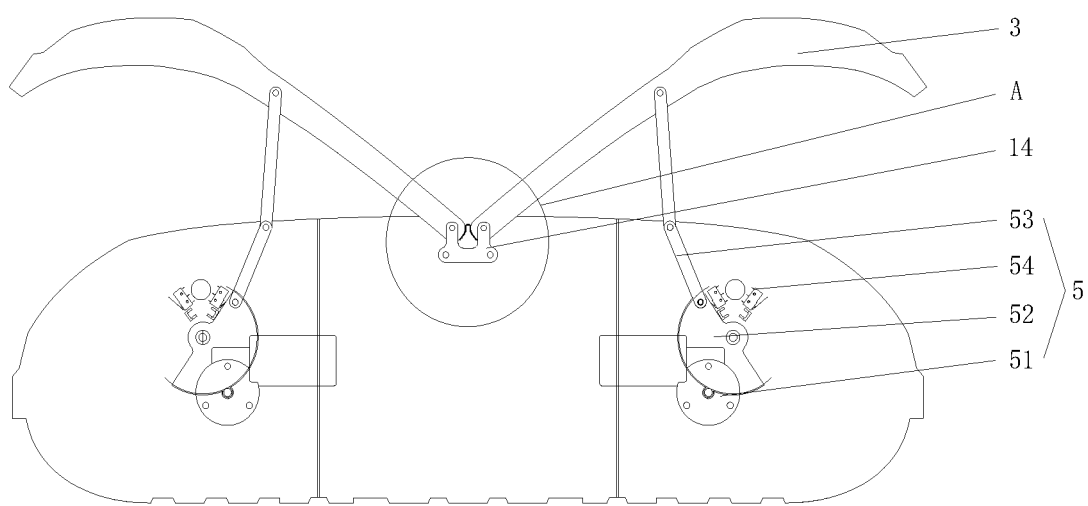
FIG. 5 is a schematic structural diagram of a transmission mechanism in an embodiment of the present application.
Figure 6:
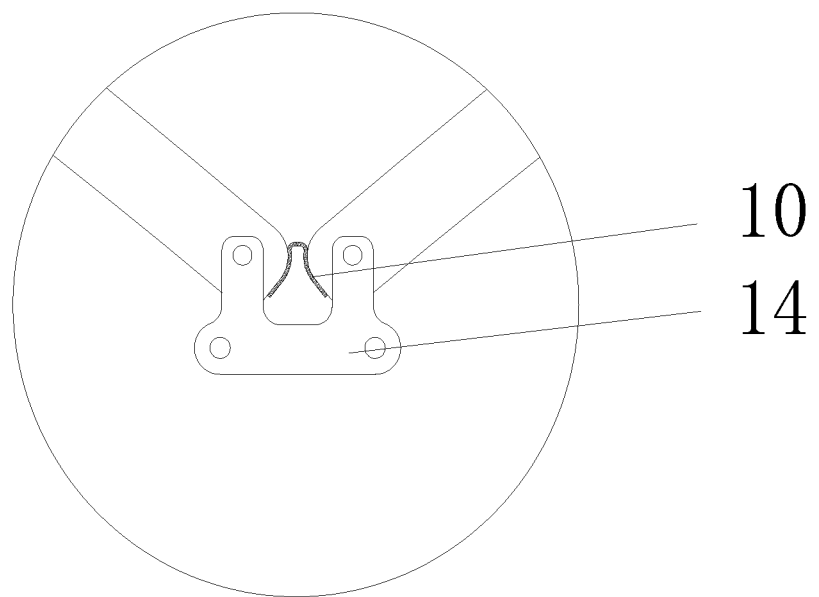
FIG. 6 is an enlarged schematic diagram of the position A in FIG. 5 of the present application.

As shown in FIGS. 1-6, a vehicle-mounted luggage case with doors opening on both sides includes a bottom 1, a center-shaft split-type lid 3, a lid opening mechanism 5, a power supply component and an electric control component 8. The case bottom 1 is formed by ABS blister and has the characteristics of high strength. An operation panel 12 is provided on either side of the case bottom 1. The operation panel 12 includes a plurality of control buttons. Through the operation panel 12, a lid on a corresponding side can be controlled to open or close. A sealed compartment 2 is provided at either narrow end of the case bottom 1. A luggage compartment 11 is formed between two sealed compartments for storing luggage. A side of the luggage compartment 11 proximal to the two sealed compartments 2 forms a bulkhead. A hinge shaft seat 14 is provided at a middle position of the bulkhead proximal to a top by bolts on the central axis of the case bottom 1.

The center-shaft split-type case lid 3 includes a lid symmetrically hinged between two hinged shaft seats 14. Two lids can be respectively buckled on both sides of the luggage compartment 11 to ensure the tightness of the luggage compartment 11. An electromagnetic lock 13 is provided at a buckle place of the case bottom 1 and the lid. The electromagnetic lock 13 includes a lock hook portion provided on the case bottom 1 and a lock portion provided on the lid. When the lid is closed, the lock hook portion automatically hooks the lock portion. When the lid is opened, the electromagnetic lock 13 pulls in, such that the lock hook portion and the lock portion are separated, and the lid is unlocked.

The lid opening mechanism 5 is symmetrically arranged on the bulkheads at both ends of the lid and connected with the lid for driving the lid to open or close.

The power supply component includes a solar panel 4 and a battery (not shown in the figure) that are electrically connected. The solar panel 4 is fixed on a top of the sealed compartment 2 on one side. The solar panel 4 absorbs solar energy and converts it into electrical energy and transmits it to the battery for storage and use. The battery is fixedly disposed in the sealed compartment 2 on another side for supplying power to various components.

The electric control assembly 8 is fixedly arranged in the sealed compartment 2 on one side, and electrically connected with the operation panel 12, the electromagnetic lock 13 and the lid opening mechanism 5, respectively.

As a preferred embodiment, the lid opening mechanism 5 includes a lid opening motor 51, a sector gear 52 and a link arm mechanism 53. The lid opening motor 51 is arranged on an inner wall of the sealed compartment 2 and is a DC motor. The sector gear 52 is rotatably arranged on the bulkhead. One end of the link arm mechanism 53 is hinged with the sector gear 52, and the other end is hinged with an end of the lid. The link arm mechanism 53 includes two hingedly connected swing arms. The sector gear 52 is driven by the lid opening motor 51 to rotate during operation to drive the swing arm to push up or pull down the lid to complete the function of opening or closing the lid. Specifically, when the lid opening motor 51 rotates forward, the lid can be driven to open, and when the lid opening motor 51 rotates reversely, the lid can be driven to close.

As a preferred embodiment, the lid opening mechanism 5 further includes two stroke switches 54 arranged on the bulkhead. The stroke switches 54 are arranged on a rotation path of the sector gear 52, and are respectively used to detect a left limit and a right limit of the rotation of the sector gear 52 in order to determine that the lid is in the highest position or in a closed state. When the sector gear 52 rotates to the left limit, it touches the stroke switch 54 for the left limit and the lid reaches the highest position. When the sector gear 52 rotates to the right limit, it touches the stroke switch 54 for the right limit, and the lid reaches the lowest position.

As a preferred embodiment, a gear cover 7 is provided on an outer side of the sector gear 52 to protect the normal operation of the sector gear 52 and prevent collisions by objects in the luggage compartment 11 affecting the service life.

As a preferred embodiment, an emergency door opening lock 31 is provided on the lid. When the power supply assembly is insufficient or other failures occur, the lid can be opened and closed manually, and the lid can be locked and unlocked through the emergency door opening lock 31. It is more flexible in use, such that an unpacking method can be switched between a traditional lock method and an electric remote control method at will.

As a preferred embodiment, the electric control assembly 8 includes a GPS positioning module (not shown in the figure). The GPS positioning module can detect a position state. When position movement is detected and the lid is in an open state, the lid is automatically closed in emergency, preventing the situation where the vehicle is being driven without closing the lid. It is safer to use, and the intelligence is improved.

As a preferred embodiment, a gap between the two lids is provided with a sealing strip 10, which is arranged between the two hinge shaft seats 14, to improve the waterproofness of the sealing between the lids and prevent rainwater from falling into the luggage compartment 11.

As a preferred embodiment, a drainage groove 9 is provided on an upper side of the bulkhead above the gap between the bulkhead and the lid, such that rainwater can be discharged through the drainage groove 9 in time, and the sealing and waterproofness are further improved.

As a preferred embodiment, a remote control (not shown in the figure) is further included. The remote control is wirelessly connected to the electric control assembly 8, specifically via infrared, to send instructions remotely to realize operations of opening and closing the compartment, which is more convenient in use.

As a preferred embodiment, a mounting frame 6 is provided under the case bottom 1, and firmly installed on the top of the vehicle to improve the safety of use.

The working principle of the present application:

When opening, an "open" button on the operation panel 12 is pressed, the electromagnetic lock 13 is unlocked, and the lid opening mechanism 5 pushes up the lid to the highest position to complete the opening operation. In this case, luggage items can be taken out or placed through the luggage compartment 11. When closing, a "close" button on the operation panel 12 is pressed, the lid opening mechanism 5 pulls down the lid to the lowest position, and the electromagnetic lock 13 locks the lid and the case bottom 1 to complete the compartment closing operation. When the vehicle is running or parked, the solar panel 4 absorbs solar energy and converts it into electric energy to be stored in the battery for use. It has the function of self-storing electric energy, reducing the dependence on the vehicle battery.

Described above are merely preferred embodiments of the present application, and cannot be used to limit the scope of protection of the present application. Any insubstantial changes and substitutions made by those skilled in the art on the basis of the present application belong to the scope of protection of the present application.

What is claimed is:

1. A vehicle-mounted luggage case with doors opening on both sides, comprising: a case bottom, a center-shaft split-type case lid, a lid opening mechanism, a power supply assembly and an electric control assembly, wherein an operation panel is provided on either side of the case bottom, a sealed compartment is provided at either end of the case bottom, a luggage compartment formed between the two sealed compartments, a bulkhead is formed on either side of the luggage compartment proximal to the two sealed compartments, and a hinge shaft seat is provided at a middle position of each bulkhead proximal to a top;

the center-shaft split-type case lid comprises a lid symmetrically hinged between two hinge shaft seats, and an electromagnetic lock is provided at a buckling position between the case bottom and the lid;

the lid opening mechanism is symmetrically arranged on the bulkheads at both ends of the lid, and the lid opening mechanism is connected with the lid;

the power supply assembly comprises a solar panel and a battery that are electrically connected, wherein the solar panel is disposed on a top of the sealed compartment on one side, and the battery is disposed in the sealed compartment on another side; and the electric control assembly is arranged in the sealed compartment on one side, and the electric control assembly is electrically connected with the operation panels, the electromagnetic lock and the lid opening mechanism, respectively.

2. The vehicle-mounted luggage case with doors opening on both sides according to claim 1, wherein the lid opening mechanism comprises a lid opening motor, a sector gear and a link arm mechanism, wherein the lid opening motor is arranged on an inner wall of a sealed compartment, the sector gear is rotatably arranged on a bulkhead, one end of the link arm mechanism is hinged with the sector gear, and the other end is hinged with an end of the lid.

3. The vehicle-mounted luggage case with doors opening on both sides according to claim 2, wherein the lid opening mechanism further comprises two stroke switches, wherein the two stroke switches are arranged on a bulkhead, and are separately configured to detect a left limit and a right limit of the rotation of the sector gear, so as to determine that the lid is in the highest position or in a closed state.

4. The vehicle-mounted luggage case with doors opening on both sides according to claim 3, wherein a gear cover is provided on an outer side of the sector gear.

5. The vehicle-mounted luggage case with doors opening on both sides according to claim 1, wherein an emergency door opening lock is provided on the lid.

6. The vehicle-mounted luggage case with doors opening on both sides according to claim 1, wherein the electric control component comprises a GPS positioning module.

7. The vehicle-mounted luggage case with doors opening on both sides according to claim 1, wherein a gap between two lids is provided with a sealing strip, wherein the sealing strip is provided between the two hinge shaft seats.

8. The vehicle-mounted luggage case with doors opening on both sides according to claim 1, wherein a drainage groove is provided on an upper side of the bulkheads.

9. The vehicle-mounted luggage case with doors opening on both sides according to claim 1, further comprising a remote control, which is wirelessly connected with the electric control assembly.

10. The vehicle-mounted luggage case with doors opening on both sides according to claim 1, wherein a mounting frame is provided under the case bottom.

\* \* \* \* \*